(12) United States Patent
Gravelle et al.

(10) Patent No.: US 8,770,472 B2
(45) Date of Patent: Jul. 8, 2014

(54) SYSTEM AND METHOD FOR AUTOMATED HOV LANE TOLL COLLECTION

(71) Applicant: Amtech Systems, LLC, Albuquerque, NM (US)

(72) Inventors: Kelly Gravelle, Poway, CA (US);
George McGraw, Corsicana, TX (US);
Charles A. Johnson, Albuquerque, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 0 days.

(21) Appl. No.: 13/793,551

(22) Filed: Mar. 11, 2013

(65) Prior Publication Data

US 2013/0248589 A1   Sep. 26, 2013

Related U.S. Application Data

(60) Provisional application No. 61/610,358, filed on Mar. 13, 2012.

(51) Int. Cl.
*G06F 17/00* (2006.01)
(52) U.S. Cl.
USPC ............................ 235/375; 235/384; 235/487
(58) Field of Classification Search
USPC ......... 235/375, 384, 385, 487, 436; 340/10.1, 340/5.61, 5.82, 928
See application file for complete search history.

(56) References Cited

U.S. PATENT DOCUMENTS

| | | | |
|---|---|---|---|
| 7,501,954 B1 | 3/2009 | Chung | |
| 7,999,682 B2 | 8/2011 | Burnett et al. | |
| 2006/0025897 A1* | 2/2006 | Shostak et al. | 701/1 |
| 2006/0044161 A1* | 3/2006 | Feldman et al. | 340/933 |
| 2006/0267736 A1 | 11/2006 | Tiernay et al. | |
| 2008/0150689 A1* | 6/2008 | Chiu et al. | 340/10.1 |
| 2010/0026465 A1 | 2/2010 | Gravelle et al. | |
| 2010/0058182 A1 | 3/2010 | Jung | |
| 2010/0085213 A1* | 4/2010 | Turnock et al. | 340/928 |
| 2010/0194542 A1 | 8/2010 | Noakes et al. | |
| 2010/0248653 A1 | 9/2010 | Merlin | |
| 2011/0102156 A1 | 5/2011 | Gravelle et al. | |
| 2011/0137773 A1* | 6/2011 | Davis et al. | 705/34 |
| 2012/0143786 A1* | 6/2012 | Karner | 705/400 |

OTHER PUBLICATIONS

International Search Report for PCT/US13/30809 mailed May 20, 2013.

* cited by examiner

*Primary Examiner* — Edwyn Labaze
(74) *Attorney, Agent, or Firm* — Caesar, Rivise, Bernstein, Cohen & Pokotilow, Ltd.

(57) ABSTRACT

An RFID tag is disclosed for use in roadway tolling systems having specially designated lanes for high occupancy vehicles, wherein more favorable toll rates are allotted to vehicles with more than one occupant. In an embodiment, the tag has a selection switch for connecting one of a plurality of ASICs to an antenna. Each ASIC is programmed to transmit a different message, wherein the message conveys information regarding the occupancy level of the vehicle. There is also information in the ASICs that is common to them for the tag.

13 Claims, 1 Drawing Sheet

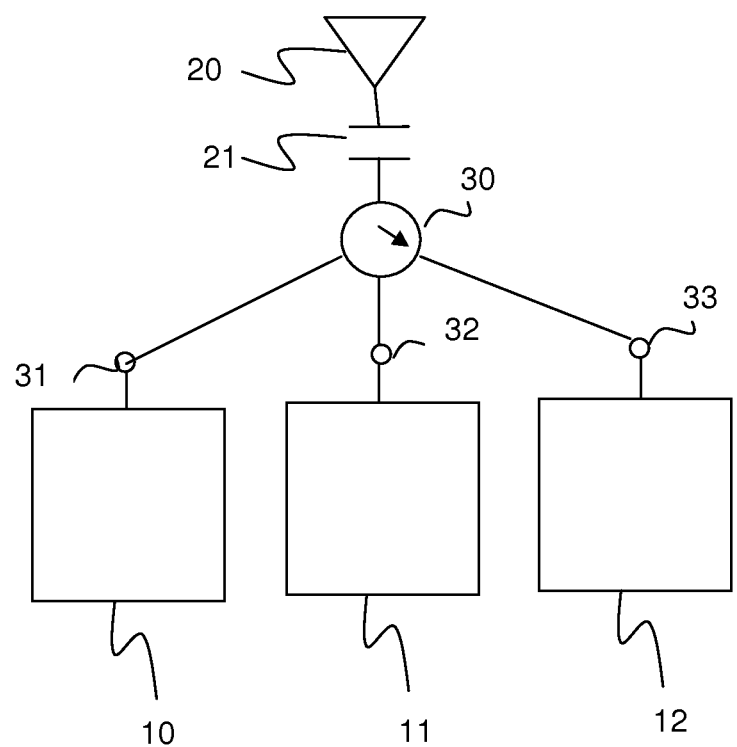

SYSTEM AND METHOD FOR AUTOMATED HOV LANE TOLL COLLECTION

CROSS-REFERENCE TO RELATED APPLICATIONS

This utility application claims the benefit under 35 U.S.C. §119(e) of Provisional Application Ser. No. 61/610,358, filed on Mar. 13, 2012 and entitled "System and Method for Automated HOV Lane Toll Collection." The entire disclosure of which is incorporated by reference.

FIELD OF THE INVENTION

The invention relates generally to the field of vehicle tolling and particularly to tolling systems having special rates for high occupancy vehicles.

BACKGROUND

U.S.Pat. No. 7,999,682 describes a method of disabling an RFID transponder for use in the implementation of among other things HOT/HOV lane application, and is incorporated herein by reference. An improvement and alternate approach to this invention has been made and is described below.

HOT/HOV lanes are often implemented in areas where there also exist conventional toll collection systems. HOT operations are generally distinguished from toll systems in that the toll paid on a HOT system is dependent upon the occupancy level of the vehicle. A vehicle with two occupants typically pays nothing and a single occupant vehicle pays the toll, but systems are under consideration where 3 toll levels might be used where vehicles with 3 occupants will pay no toll, a discounted toll is paid by vehicles with 2 occupants, and the full toll is paid by single occupant vehicles.

Most HOT systems depend upon self-declaration as to the occupancy of the vehicle by some action by the driver. This could simply involve removing and shielding the transponder when no toll is due, but other types of systems in the prior art include transponders with a switch or other input that allows the driver to input the occupancy nomination into the transponder data. Another approach described in U.S. Pat. No. 7,999,682 is to provide a mechanism for the driver to disable the transponder without removing it, which is effective and convenient particularly for use with passive transponders. However, this approach only provides for an on/off function and is limited therefore to toll/no toll types of applications. Further, with this approach there is a risk that the tag will be disabled if the driver deliberately or inadvertently leaves the tag in the off position when used in a normal toll system, causing either violations or increased cost of video processing for the toll authority depending on the details of their electronic toll collection design.

US Publication 20110102156 describes a system to allow for the occupancy status stored in a tag to be recalled in order to facilitate enforcement operation in a HOT system and is incorporated herein by reference. US publication 20100026465 describes the operation of user input and feedback of a tag used in a HOT application and can be used in combination with the invention described herein, and is incorporated by reference.

DESCRIPTION OF THE DRAWINGS

FIG. 1 is a block diagram of an exemplary embodiment of an inventive toll tag.

DESCRIPTION OF THE PREFERRED EMBODIMENT OF THE INVENTION

Rather than a simple function of disabling the passive RFID transponder, the present invention provides a mechanism to select among two or more passive RFID application specific integrated circuits (ASICS) to connect to the transponder's antenna circuit. The driver operates this mechanism to indicate the occupancy status of the vehicle. Each ASIC has some unique data programmed into the ASIC that represents a corresponding occupancy status. When the transponder is read by a reader, the unique data section is read by the reader and the content of this data identifies the switch position selected by the driver and the HOT toll can charged accordingly. If two ASICS are used, the selection switch connects the antenna circuit to either ASIC and is designed to minimize or eliminate the possibility of no ASIC being connected. This gives the ability to select two different toll levels for HOT applications. However, a different memory location in the ASIC can also be programmed with common data representing the conventional toll account, typically this an ID number that is compatible with and indexed to the existing toll system database so that it is compatible with the installed base toll system. This common memory location is read by the readers that are used in the toll system, so that regardless of the occupancy switch position the toll system will be able to read the tag and will have a common tag ID or index number that can be used to look up and charge the appropriate account associated with the transponder.

Within a HOT system, the above approach has the advantage over a disabling approach in that a tag read is expected regardless of the occupancy status of the vehicle. This is advantageous in implementing enforcement schemes for HOT where all users regardless of status are required to have a transponder, since automated detection of those who simply choose to disable the transponder in an effort to evade payment can be detected.

With Reference to FIG. 1, In order to select the ASIC 10, 11, 12 to be connected to the antenna circuit 20 a number of techniques may be used. One approach is to use a commercial off the shelf three position selector switch 30, which may be a rotating switch. The switch should be selected to have the same impedance within a small tolerance in all three switch positions so that it can be accounted for in the matching network (not shown) between the ASIC and the antenna circuit. A decoupling capacitor 21 can be put into the circuit in series with each switch position if an AC coupled design is desired or required. Another technique is to connect the antenna capacitively to each ASIC on a printed circuit board or flexible substrate. This can be done for example by having the ASICS to be selected on one side of a circuit board and the antenna circuit on the other. Each ASICs RF port is connected to a capacitive pad 31, 32, 33. The switch mechanism acts to place a co-operating pad over the ASIC side pad to form the capacitive connection to the antenna when in position. The ASIC selection is then made when the user operates the mechanism to move the co-operating pad proximate to the selected ASIC's pad.

For example, such a mechanism could be a slider that moves the co-operating pad linearly, or alternatively a rotating disc that moves the cooperating pad in a circular motion to align with the appropriate ASIC pad. In this example three ASICs might be used, each one indicating occupancy levels of either 1, 2, or 3 or more. In all switch positions a normal toll reader can read the commonly programmed and indexed toll ID number in whichever ASIC is connected to the antenna, and charge the toll to the proper account associated with that account or ID, and without having to change the index numbering or ID system used to look up that account. When used in the HOT operation the reader reads a different memory location in the ASIC where the data is differentiated sufficiently to allow association of the data read to the selector switch position on the tag indicating the occupancy level.

US Publication number 20060267736 describes a dual mode RFID transponder that incorporates both an read/write protocol and a read only protocol and is incorporated herein by reference. One aspect of the invention is to use specifically the read only protocol to access the common ID that is contained in a separate memory location within the ASIC. All the ASICS will use a common memory location for the read only protocol, such that no matter which ASIC is connected to the antenna circuit, and as a result read by the reader, the ID number will be the same and the one used by the existing toll agency for that transponder. The read/write protocol is then used to allow access to the memory locations where the ID/index number is differentiated and therefore indicative of the switch position and selection and therefore the indicated vehicle occupancy and used for HOT lanes. The numbers used that include occupancy information can be derived or cross-referenced to the common ID number if desired.

However, such an approach can be used with single protocol approach by simply assigning different memory locations within the ASIC to be either the common identification data, or the differentiated data that identifies the selector switch position. This approach can be used with well known RFID protocols such as the SeGO® protocol transponder available from TransCore®, or transponders that comply with different standards such as ISO 180006B or ISO 180006C.

Those in the art will appreciate there are some variations that are possible in implementing the above invention, the description above is intended to be inclusive of those variations.

The invention claimed is:

1. An RFID tag for use in roadway tolling comprising: a first ASIC; a second ASIC; an antenna; wherein said tag having a first memory location for vehicle identification and a second memory location for vehicle occupancy; and a selector switch, wherein said first ASIC is programmed to transmit information including a first occupancy level, said second ASIC is programmed to transmit information including a second occupancy level, and said selector switch connects either said first or second ASIC to said antenna.

2. The RFID tag of claim 1, wherein said first and second ASICS also transmit information that is common to both ASICS in addition to said information regarding occupancy level.

3. The RFID tag of claim 1, further comprising a third ASIC, wherein said third ASIC is programmed to transmit information including a third occupancy level, and
   said selector switch connects either said first, second or third ASIC to said antenna.

4. The RFID tag of claim 1, wherein said selector switch connects said first and second ASICs to said antenna through a capacitive pad.

5. The RFID tag of claim 4, wherein said switch comprises a rotating disc.

6. The RFID tag of claim 1, wherein said selector switch is AC coupled to said antenna.

7. A system for electronic collection of roadway tolls comprising: a tag reader; a tag having a first memory location for vehicle identification and a second memory location for vehicle occupancy, wherein said tag reader uses a read only protocol to access said first memory location and a read/write protocol to access said second memory location; wherein said RFID tag comprises a first ASIC; a second ASIC; an antenna; and a selector switch, wherein said first ASIC is programmed to transmit information including a first occupancy level, said second ASIC is programmed to transmit information including a second occupancy level, and said selector switch connects either said first or second ASIC to said antenna.

8. The system, of claim 7, wherein said first and second ASICS also transmit information that is common to both ASICS in addition to said information regarding occupancy level.

9. The system of claim 7, further comprising a third ASIC, wherein said third ASIC is programmed to transmit information including a third occupancy level, and said selector switch connects either said first, second or third ASIC to said antenna.

10. The system of claim 7, wherein said selector switch connects said first and second ASICs to said antenna through a capacitive pad.

11. The system of claim 7, wherein said selector switch is AC coupled to said antenna.

12. The system of claim 7, wherein said switch comprises a rotating disc.

13. A method for automated vehicle toll collection comprising:
   providing an RFID transponder reader;
   providing an RFID transponder for use in the vehicle, said RFID transponder having:
   a first ASIC;
   a second ASIC;
   an antenna; and
   a selector switch, wherein
   said first ASIC is programmed to transmit information including a first occupancy level,
   said second ASIC is programmed to transmit information including a second occupancy level, and
   said selector switch connects either said first or second ASIC to said antenna actuating said selector switch to connect said first ASIC to said antenna to indicate said first
   occupancy level and actuating said selector switch to connect said second ASIC to said antenna to indicate said second occupancy level.

* * * * *